United States Patent [19]

Hakeem

[11] Patent Number: 4,872,725
[45] Date of Patent: Oct. 10, 1989

[54] CHILD SEAT

[76] Inventor: Terri A. Hakeem, 2007 N. Shiawassee, S.E., Grand Rapids, Mich. 49506

[21] Appl. No.: 85,401

[22] Filed: Aug. 17, 1987

[51] Int. Cl.[4] ............................................. A47C 1/08
[52] U.S. Cl. ............................... 297/250; 280/87.01; 297/485; 297/488
[58] Field of Search ............... 297/250, 467, 487, 485, 297/488; 280/87.01, 47.35

[56] References Cited

U.S. PATENT DOCUMENTS

| | | | |
|---|---|---|---|
| 1,198,001 | 9/1916 | Best | 280/87.01 X |
| 1,234,753 | 7/1917 | Griswold | 280/87.01 |
| 1,704,346 | 3/1929 | Schneider | 297/467 X |
| 2,263,898 | 11/1941 | Michelic | 297/467 X |
| 2,426,432 | 8/1947 | Breckner et al. | 280/47.35 X |
| 2,586,495 | 2/1952 | Woods | 280/47.35 |
| 2,676,054 | 4/1954 | Pasin | 280/87.01 X |
| 3,767,259 | 10/1973 | Blake et al. | 297/488 X |
| 4,195,879 | 4/1980 | Miller | 297/184 |
| 4,602,392 | 7/1986 | Grier et al. | 297/467 X |
| 4,650,246 | 3/1987 | Henriksson | 297/250 |

FOREIGN PATENT DOCUMENTS 461344 11/1949 Canada .............................. 280/87.01
2811592 9/1979 Fed. Rep. of Germany ...... 297/488

Primary Examiner—Kenneth J. Dorner
Assistant Examiner—Thomas A. Rendos
Attorney, Agent, or Firm—Jones, Day, Reavis & Pogue

[57] ABSTRACT

A seat for use in conjunction with a wagon or other similar article to restrain a small child riding in the wagon. The seat is configured to fully support the child and includes a curved back support having an upper extension in the form of a ring portion. A forward post depends from a center part of the ring portion and is to be received between a child's legs. The ring portion is provided with transversely aligned slots through which a restraining strap passes. The strap wraps around and under the wagon body to mount the seat to the body. Lower parts of the seat are provided with anti-skid pads for engaging the bottom of the wagon. The wagon bottom forms a seating surface for the child.

7 Claims, 3 Drawing Sheets

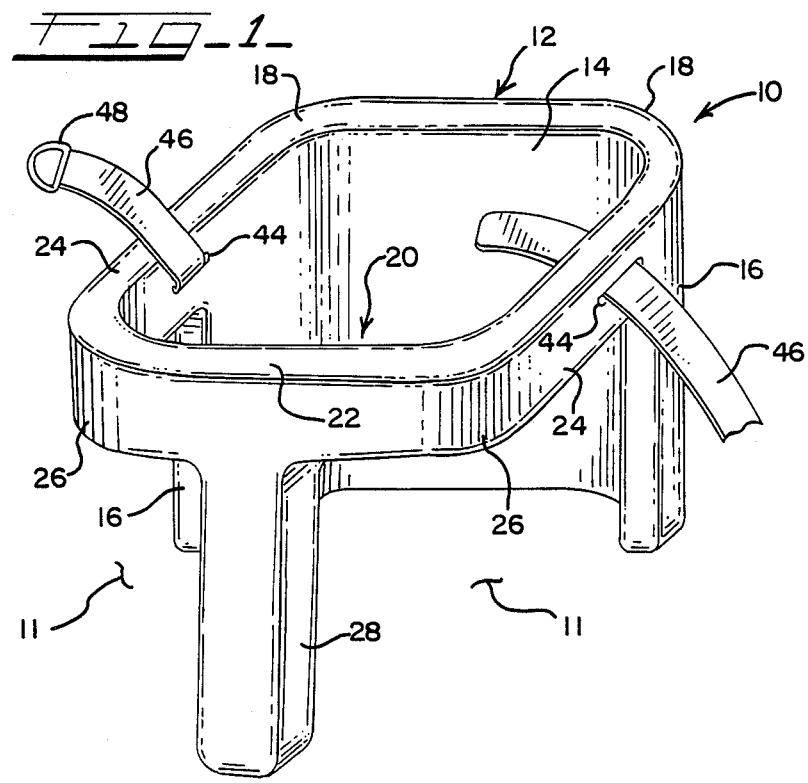
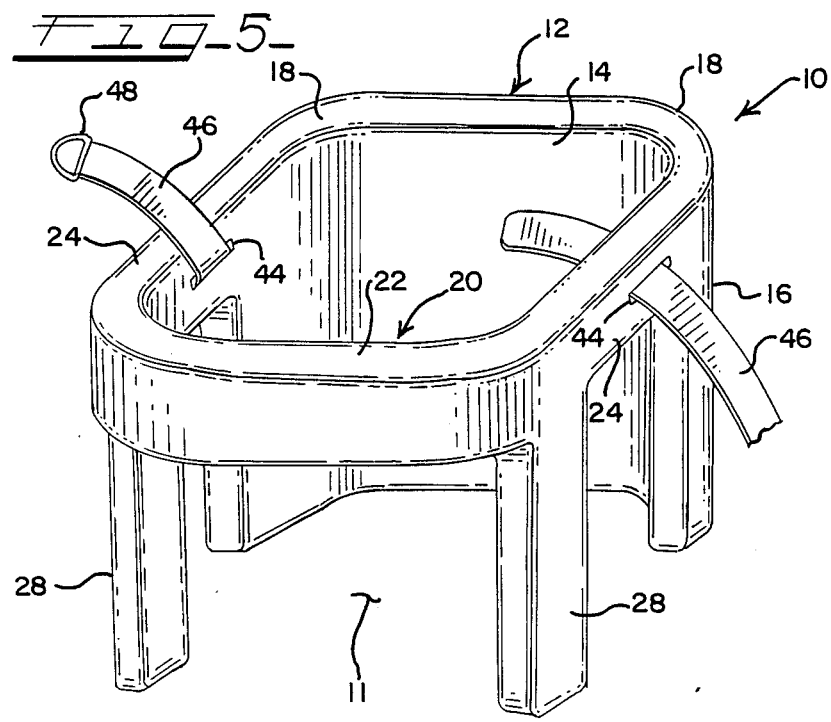

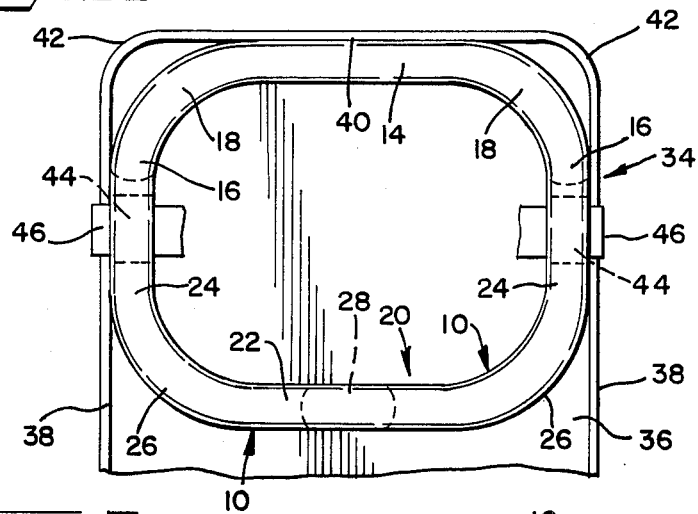
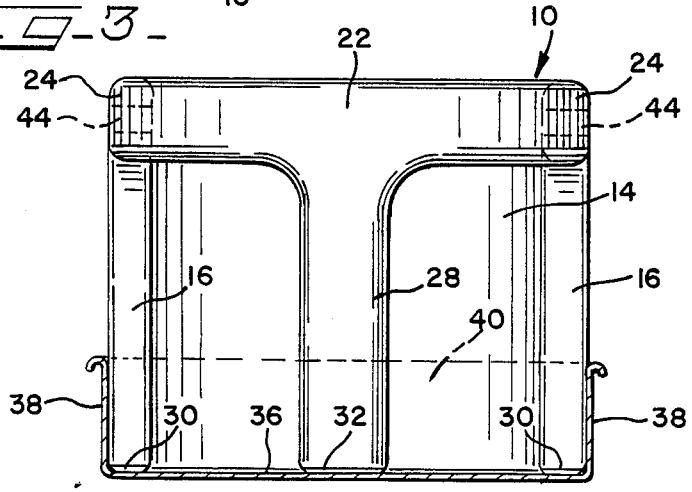
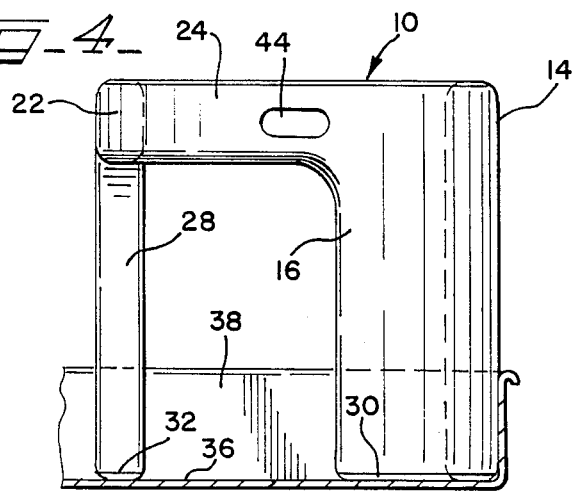

CHILD SEAT

FIELD OF THE INVENTION

This invention relates in general to new and useful improvements in child seats, and more particularly to a child's seat adapted for use in combination with a wagon or other similar article.

BACKGROUND OF THE INVENTION

Wagons are popular conveyances for small children. However, the usual wagon body has only a relatively short upstanding side wall with the result that when an unstable condition exists a small child positioned within the wagon body is apt to fall out of the same. This may be so even after a child's unsuccessful attempts at stabilizing himself/herself by gripping on to the wall. Parents frequently attempt to solve the problem of stability of a child within a wagon by utilizing pillows, blankets and the like which do little to eliminate the problem.

SUMMARY OF THE INVENTION

A child seat is adapted to be supported on a wagon having a body. The seat comprises a back support, a pair of side portions forming extensions of the back support, a transverse front portion, and opening means provided in one of the front and pair of side portions and adapted to receive a child's limbs. At least one of the back support and front and pair of side portions have lower surfaces adapted to engage the wagon body to support the seat thereon. The back support and front and side portions form a partial enclosure adapted to restrain a child.

A portion of at least one of the side and front portions has a vertical dimension less than that of the back support and is adapted to be spaced above a wagon body when the seat is supported on the body. One of the side and front portions is adapted to cooperate with the wagon body to define the opening means.

The seat also includes at least one front support depending downwardly from one of the side and front portions. The front and back supports have lower surfaces adapted to engage the wagon body to support the seat thereon. The opening means is partially defined by the front support.

In one embodiment of the invention, the front support depends downwardly from a central part of the front portion and the opening means comprises an opening on each side of the front support and adapted to receive a child's limb. In another embodiment of the invention, a front support depends downwardly from each of the side portions and the opening means includes an opening positioned between the front supports and is adapted to receive a child's limbs.

The back support comprises a transverse back panel and longitudinal side panels joined by curved intermediate panels. The transverse back, longitudinal side and curved panels define a wrap-around back support. In one embodiment of the invention, the intermediate panels have a curvature enabling the seat to be received within a wagon body having curved rear portions.

The seat further includes antiskid means on lower mounting surfaces of the back and front supports and tending to prevent movement of the seat with respect to the wagon body when the seat is supported on the wagon body.

The seat also includes a restraining means on at least one of the back support and side portions for mounting the seat to the wagon body and retaining a child in the seat. In a preferred embodiment of the invention, the restraining means comprises a pair of aligned slots extending through the side portions, and a strap having ends in registry with the slots, the strap being adapted to extend transversely of and below the body to securely mount the seat to the wagon body.

The invention also contemplates the combination of the wagon and the seat.

BRIEF DESCRIPTION OF THE DRAWINGS

The invention is hereinbelow described with reference to the accompanying drawings in which:

FIG. 1 is a top front perspective view of the seat;

FIG. 2 is a plan view thereof securely mounted in a rear portion of a wagon body by a restraining strap of the seat;

FIG. 3 is a front elevational view thereof, with the restraining strap removed;

FIG. 4 is a side elevational view thereof mounted in the wagon body, with portions of the wagon body broken away and the restraining strap removed; and FIG. 5 is a top front perspective view of an alternative embodiment thereof.

DESCRIPTION OF THE PREFERRED EMBODIMENTS

Referring now to the drawings in detail, and in particular to FIG. 1, there is shown a child's seat generally indicated by reference numeral 10 and adapted to mount to a conventional child's wagon of the type described below. It will also be seen that the seat is adapted to mount to a typical child's sled as well. The seat 10 is preferably formed of an injection molded plastic, although it is feasible to form the same of a foamed plastic or even wood or metal.

The seat 10 comprises a back support 12 having a transversely extending rear panel 14, and a pair of longitudinally extending side panels 16. The panels 14,16 are connected together by intermediate curved portions 18. It will be seen that the back support 12 is of the wrap-around type and provides full support for a child positioned within the seat 10.

The seat 10 also includes an upper ring portion 20 which extends only a portion of the vertical dimension of the back support 12. The ring portion 20 includes a front part 22 and side parts 24 joined together by intermediate curved parts 26. The ring portion 20 is a continuation of the back support 12, the ring portion and back support forming a partial enclosure in which a child is adapted to be positioned.

In addition, the seat 10 includes a front support 28 preferably in the form of a post. The front support 28 is centrally located with respect to the upper ring portion 20, extends downwardly therefrom and is of substantially the same height as the side panels 16. So constructed, the seat 10 has openings 11 positioned between the panels 16 and the front support 28. The openings 11 function as spaces through which a child's legs can be positioned when the child is positioned in the seat 10.

An alternative embodiment of the seat is shown in FIG. 5, wherein a front support 28 depends downwardly from each side part 24 of the upper ring portion 20. An opening 13 positioned between the supports 28 forms a space through which a child's legs can be positioned when the child is in the seat.

A further embodiment, not illustrated in the drawings, contemplates that the back support 12 and front and side parts 22, 24 are solid and substantially equal in vertical dimension, with a pair of openings 11 extending through one of the front and pair of side parts.

As shown in FIGS. 3 and 4, in order to restrict forward sliding movement of the seat 10 with respect to the wagon, lower surfaces of the side panels 16 are provided with non-skid pads 30. The front support 28 also has formed on a lower surface thereof a non-skid pad 32.

As stated above, the seat 10 is adapted to mount to a wagon having a body 34 movably supported on a plurality of wheels (not shown). With reference to FIGS. 2–4, in which only a portion of the body 34 is illustrated, the same includes a bottom wall 36 having about the periphery thereof an upstanding rim. The rim includes longitudinally extending portions 38 and a transversely extending rear portion 40. The portions 38, 40 are joined together by curved portions 42. It will be seen that the radius of curvature of the curved portions 42 is less than that of the curved intermediate portions 18 of the seat 10. In this manner, when the seat 10 is positioned within the wagon body 34, the seat readily clears the rear corners 42.

So that the seat 10 may be restrained against movement relative to the wagon body 34, the side parts 24 of the ring portion 20 are provided with transversely aligned slots 44. As shown in FIGS. 2 and 4, the slots 44 are formed in the rear portions of the side parts 24. An elongated strap 46, having a buckle 48 on one end thereof, passes through the slots 44 as is shown in FIG. 1. It is to be understood that the strap 46 is of a length to pass beneath and entirely around the wagon body 34 as is generally shown in FIG. 2. The strap 46 functions to retain the seat 10 within the wagon body 34. While only a single strap has been illustrated and described, it is to be understood that auxiliary straps may be utilized if so desired. It should be noted that when it is desired to utilize the seat 10 to retain a child while riding on a sled, that the strap 46 can be passed beneath the substantially planar sled body or bed in the same manner as that described above in connection with the wagon to mount the seat to the sled.

In the preferred usage of the seat 10, the rear panel 14 of the back support 12 is butted against the rear transverse portion 40 of the upstanding rim of the wagon body 14. Thus, the seat is prevented from moving rearwardly. The strap 46 in combination with the nonskid pads 30, 32 prevent longitudinal movement of the seat 10 relative to the wagon body 34. Further, while the seat 10 has been illustrated as being of a width corresponding to the width of the wagon body 34, it is to be understood that should the wagon body 34 be wider than the seat 10, the strap 46 in combination with the non-skid pads 30, 32 will restrain the seat against transverse movement relative to the wagon body.

It is to be noted that the wagon body bottom 36 functions as the actual seating surface for a child seated in the seat 10.

Although only certain embodiments of the child's seat 10 have been specifically illustrated and described herein, it is to be understood that minor variations may be made in a child's seat without departing from the spirit and scope of the invention as defined by the appended claims.

The embodiments of the invention in which an exclusive property or privilege is claimed are defined as follows:

1. A vehicle comprising a child's wagon, waid vehicle having a body defining a bed upon which the child sits, and a restraint resting on said bed, said restraint comprising:
   a back support comprising a transverse back panel and longitudinal side panels joined by curved intermediate panels, said transverse back, longitudinal side and curved panels defining a wrap-around back support, said curved intermediate panels having a curvature received within the wagon body having complementary curved rear portions, a pair of side portions forming extensions of said back support, and a transverse front portion, and opening means provided in one of said front and pair of side portions and adapted to receive a child's limbs, the back support, side portions and front portion defining open top and bottom portions for the restraint for receiving the child's body and enabling the child to sit directly on the vehicle bed, a portion of at least one of said side and front portions having a verticle dimension less than that of said back support and being spaced above said bed, said one of said side and front portions cooperating with said bed to define said opening means, at least one of said back support and front and pair of side portions having lower surfaces engaging said bed to support said restraint thereon, said back support and front and side portions forming a partial enclosure adapted to restrain the child, and including means securing said restraint in position on said bed, said restraint further comprising at least one front support depending downwardly from one of said side and front portions, said front and back supports having lower surfaces adapted to engage the bed to support said restraint thereon, and said opening means being partially defined by said front support.

2. A vehicle according to claim 1, wherein said front support depends downwardly from a central part of said front portion and said opening means comprises an opening on each side of said front support and adapted to receive a child's limb.

3. A vehicle according to claim 1, wherein said lower surfaces of said back and front supports are substantially coplanar and include antiskid means tending to prevent movement of said restraint with respect to said bed when said restraint is supported on the wagon body.

4. A vehicle according to claim 1, wherein said securing means comprises a pair of aligned slots extending through said side portions, and a strap having ends in registry with said slots, said strap extending transversely of and beneath the vehicle bed to securely mount said restraint on said bed.

5. A vehicle according to claim 1, wherein a pair of front supports depends downwardly from opposed side portions, and wherein said opening means comprises an opening positioned between said front supports and adapted to receive a child's limbs.

6. A vehicle according to claim 1 wherein, said wagon defines upstanding side walls, and wherein the lateral dimensions of said restraint substantially correspond to the distance between said side walls whereby said side walls inhibit lateral movement of the restraint.

7. A vehicle according to claim 1 wherein said wagon defines an upstanding back wall, and wherein said back support is positioned adjacent said back wall to minimize longitudinal shifting movement between said restraint and said wagon bed.

* * * * *